United States Patent Office 3,746,661
Patented July 17, 1973

3,746,661
METHOD OF PREPARING A CATALYST FOR THE HYDROREFINING OF RESIDUAL OILS
Mark J. O'Hara, Mount Prospect, Ill., assignor to Universal Oil Products Company, Des Plaines, Ill.
No Drawing. Filed Dec. 6, 1971, Ser. No. 205,341
Int. Cl. B01j 11/40
U.S. Cl. 252—455 R                    5 Claims

ABSTRACT OF THE DISCLOSURE

An improved method of preparing a catalyst comprising a Group VI–B and Group VIII metal impregnated on a refractory inorganic oxide carrier material, said catalyst being particularly useful in the hydrorefining of residual oils of high asphaltene content and being particularly effective for the conversion and separation of sulfurous components in said residual oils. The carrier material, prior to impregnation with the Group VI–B and Group VIII metal components, is dried to reduce the volatile content thereof to less than about 30 wt. percent, and calcined in an oxidizing atmosphere at a temperature increasing from about 125° to about 600° C. in a period from about 30 to about 90 minutes, and thereafter at a temperature of from about 600° to about 800° C.

---

This invention relates to a method of manufacturing a catalyst particularly adapted to the hydrorefining or residual oils. Residual oils are the liquid or semi-liquid products recovered as a non-distillable bottoms fraction or residue in the distillation of petroleum. The residual oils are highly carbonaceous refractory materials variously referred to as asphaltum oil, liquid asphalt, black oil, petroleum tailings, residuum, residual reduced crude, vacuum bottoms, and the like. In general, the hydrorefining or hydrotreating of residual oils is designed for the conversion of $C_7$-insoluble asphaltenes and other hydrocarbonaceous matter to more valuable distillable petroleum products, and/or the conversion and separation of sulfurous components to render the residual oil useful, for example, as a fuel oil.

Catalysts comprising a metal of Groups VI–B and VIII, preferably impregnated on an alumina or alumina-silica carrier material, have received art recognition for their capacity to convert $C_7$-insoluble asphaltenes as well as sulfurous compounds in residual oils at hydrorefining conditions. In general, Groups VI–B and VIII metal catalysts with a surface area of from about 120 to about 250 m.²/gm., an average pore diameter of from about 60 to about 120 angstroms, and an average pore volume of from about 0.3 to about 0.5 cc./gm., are most effective for the hydrorefining of residual oils. However, a given catalyst, substantially as described, is not necessarily as effective with respect to the conversion of $C_7$-insoluble asphaltenes as it is with respect to the conversion of sulfurous components, while another catalyst, substantially as decribed, may be more effective to convert $C_7$-insoluble asphaltenes than sulfurous components. For example, it has been observed that a residual oil is most effectively hydrotreated for the conversion of $C_7$-insoluble asphaltenes utilizing a catalyst, substantially as described, but with a surface area in the lower range of from about 120 to about 170 m.²/gm., and an average pore diameter in the upper range of from about 100 to about 120 angstroms. On the other hand, the residual oil is most effectively hydrotreated for the conversion and separation of sulfurous components utilizing a catalyst, substantially as described, but with a surface area in the upper range of from about 150 to about 250 m.²/ gm. and an average pore diameter in the lower range of from about 60 to about 100 angstroms, the average pore volume being in either case from about 0.3 to about 0.5 cc./gm.

It is an object of this invention to present an improved method of preparing a catalyst comprising a Group VI–B and Group VIII metal component impregnated on a refractory inorganic oxide carrier material, said catalyst being particularly useful for the conversion of sulfurous components in a residual oil at hydrorefining conditions. Thus, according to one embodiment of this invention, an improved method of manufacture comprises drying the refractory inorganic oxide carrier material to contain less than about 30 wt. percent volatile matter prior to impregnation as determined by weight loss on ignition at 500° C., calcining the dried carrier material in an oxygen-containing atmosphere at a temperature increasing from about 125° to about 600° C. in a period of from about 30 to about 90 minutes, and thereafter at a temperature of from about 600° to about 800° C. for a period of at least about 30 minutes.

Other objects and embodiments of this invention will become apparent in the following detailed specification.

The refractory inorganic oxide component of the catalyst composite of this invention, while serving as a carrier for the other catalytic components, contributes to the overall activity and stability of the catalyst composite. Suitable refractory inorganic oxides include alumina, silica, zirconia, boria, thoria, etc., or combinations thereof, particularly alumina in combination with one or more refractory inorganic oxides. Alumina composited with silica in a weight ratio of about 1.5:1 to about 9:1, preferably from about 3:1 to about 9:1, is a particularly suitable refractory inorganic oxide and the further description of the method of manufacture of this invention is presented with reference thereto.

Many methods are known for preparing the preferred alumina-silica composite. The simplest and most widely practiced methods involve either the precipitation of one of the components, alumina or silica, from a sol as a gel, said gel being thereafter impregnated with a solution of a suitable gel precursor of the other component which is thereafter precipitated to form an alumina-silica cogel, or alternatively, both components, alumina and silica, may be coprecipitated from a common sol. In the latter case, it is most convenient to prepare an acidic silica sol and an alumina sol and then commingle the sols in the desired proportion. Alumina-silica composites comprising alumina in at least an equimolar amount with silica are especially well prepared by this last described method.

Several alternative procedures are available for preparing an acidic silica sol. In one method, a suitable mineral acid such as hydrochloric acid, sulfuric acid, or nitric acid is added to an aqueous solution of an alkali metal silicate, sodium silicate being preferred because of its low cost and general availability. In a second method, the order of addition is reversed, the water glass being added to the acid. The latter technique is preferred since the formation of the silica sol always occurs under acid conditions and there is no danger of the sol prematurely solidifying as is the case in the former method when the pH of the system is reduced from a high value to a low value. When using hydrochloric or sulfuric acid, concentrations thereof of from about 10% to about 30% are satisfactory. The water glass solution may be prepared from commercial sodium silicates, such as Philadelphia Quartz Company, brands "E," "M," "N," or "S." The commercial water glass is first diluted with water to reduce the silica concentration thereof to about 5–15 wt. percent. The commingling of acid and water glass is preferably carried out with agitation and at a temperature below about 35° C. The pH of the acidic sol at this stage will be in the range of 1.5–2. If desired, the silica sol may be aged at this pH for a period of 0.1–1 hours or more.

While an alumina sol precursor, such as an aqueous solution of aluminum sulfate, aluminum chloride or aluminum nitrate may be commingled with the silica sol, it is preferable to employ a true alumina sol. One method of preparing an alumina sol is in the electrolysis of an aluminum salt solution, such as an aqueous aluminum chloride solution, in an electrolytic cell having a porous partition between the anode and the cathode whereby an acid anion deficient aluminum salt solution, or sol, is recovered from the cathode compartment. Preferably, the alumina sol is an aluminum chloride sol prepared by treating an excess of aluminum particles in aqueous hydrochloric acid and/or aluminum chloride solution, usually at about reflux temperature until a quantity of aluminum has been digested sufficient to form a sol of predetermined aluminum/chloride ratio which influences the pore volume and pore diameter characteristics of the alumina-silica composite as hereinafter related.

The separately formulated silica and alumina sols are then blended to yield an acidic hydrosol of alumina and silica. The alumina sol may be added to the silica sol, or the silica sol may be added to the alumina sol or both may be continuously admixed with an in-line blender. The mixing should be done with agitation and with water addition, if necessary, to prevent premature gelation at this point, since the blended sol is undergoing some polymerization as viscosity increases.

A preferred method of preparing the alumina-silica component relates to the cogelation of an alumina sol and a silica sol to form spherical gel particles utilizing the well-known oil drop method. Thus, an alumina sol, suitably prepared by digesting aluminum pellets in aqueous hydrochloric acid solution, is commingled with a silica sol, suitably prepared by the acidification of water glass as is commonly practiced, and the sol blend dispersed as droplets in a hot oil bath whereby gelation occurs with the formation of spheroidal particles. In this type of operation, the silica is set thermally, the alumina being set chemically utilizing ammonia as a neutralizing or setting agent. Usually the ammonia is furnished by an ammonia precursor which is included in the sol. The ammonia precursor is suitably urea, hexamethylenetetramine, or mixtures thereof, although other weakly basic materials which are substantially stable at normal temperatures but hydrolyzable to ammonia with increasing temperature may be employed. Only a fraction of the ammonia precursor is hydrolyzed or decomposed in the relatively short period during which initial gelation occurs. During the subsequent aging process, the residual ammonia precursor retained in the spheroidal gel particles continues to hydrolyze and effect further polymerization of the alumina-silica whereby the pore characteristics of the composite are established. The alumina-silica particles are aged, usually for a period of from about 10 to about 24 hours at a predetermined temperature, usualy from about 50 to about 105° C., and at a predetermined pH value. The aging time is substantially reduced utilizing pressure aging techniques. With alumina-silica ratios in the higher range, pressure aging tends to lower the bulk densities.

As previously stated, and as heretofore disclosed in the art, the foregoing method affords a convenient means of developing desired physical characteristics of the carrier material. Thus, one skilled in the art will appreciate that in general the aluminum/chloride ratio of the alumina sol will influence the average bulk density of the alumina-silica product and, correspondingly, the pore volume, pore diameter characteristics attendant therewith, lower ratios tending toward higher average bulk densities. Other process variables affecting physical properties of the carrier material include the time, temperature and pH at which the particles are aged. Usually, temperatures in the lower range and shorter aging periods tend toward higher average bulk densities.

In any case, the refractory inorganic oxide is dried and calcined pursuant to the method of this invention prior to impregnation with the Group VI–B and Group VIII metal components. More specifically, the refractory inorganic oxide carrier material is dried to reduce the volatile matter thereof to less than about 30 wt. percent as determined by weight loss on ignition at 500° C. Calcination in accordance with the method of this invention comprises heating the carrier material in an oxygen-containing atmosphere, such as air, at a temperature increasing from about 125° to about 600° C. in a period of from about 30 minutes to about 90 minutes, and thereafter at a temperature of from about 600° to about 800° C. for at least about 30 minutes, and not necessarily in excess of about 8 hours.

It is the usual practice to deposit catalytically active metallic components on a support or carrier material by the method whereby a soluble compound of the desired metallic component is impregnated on the carrier material from an aqueous solution. The soluble compound serves as a precursor of the metallic component such that, upon subsequent heating of the impregnated carrier material at a temperature effecting decomposition of said compound, the desired metallic component is formed deposited on the carrier material. The hydrorefining catalyst of this invention is prepared to contain metallic components comprising a metal of Group VI–B and Group VIII. Thus, the catalyst composite may comprise chromium, molybdenum and/or tungsten in combination with one or more metals of Group VIII, i.e., iron, nickel, cobalt, platinum, palladium, ruthenium, rhodium, osmium and iridium. The aqueous impregnating solution will thus comprise a soluble precursor compound of a group VI–B metal. Suitable compounds include ammonium molybdate, ammonium paramolybdate, molybdic acid, ammonium chromate, ammonium peroxy chromate, chromium acetate, chromous chloride, chromium nitrate, ammonium metatungstate, tungstic acid, etc. The impregnating solution is suitably a common solution of a Group VI–B metal compound and a Group VIII metal compound. Suitable soluble compounds of Group VIII metals include nickel nitrate, nickel sulfate, nickel chloride, nickel bromide, nickel fluoride, nickel iodide, nickel acetate, nickel formate, cobaltous nitrate, cobaltous sulfate, cobaltous fluoride, ferric fluoride, ferric bromide, ferric nitrate, ferric sulfate, ferric formate, ferric acetate, platinum fluoride, chloroplatinic acid, chloropalladic acid, palladium fluoride, etc. Of the Group VI–B metals, molybdeum is preferred. The Group VI–B metal is suitably employed in an amount to comprise from about 5 to about 20 wt. percent of the final catalyst composite. The Group VIII metal, which is preferably nickel, is effective in an amount comprising from about 0.1 to about 10 wt. percent of the final catalyst compound.

Impregnation of the carrier material can be accomplished by conventional techniques whereby the carrier material is soaked, dipped, suspended or otherwise immersed in the impregnating solution at conditions to adsorb a soluble compound comprising the desired catalytic component. Certain impregnating techniques have been found to be particularly favorable to promote the desired physical properties of the finished catalyst. Thus, impregnation of the Group VI–B and Group VIII metal components is preferably from a common aqueous ammoniacal solution of soluble compounds thereof, for example, an ammoniacal solution of molybdic acid and nickel nitrate. Further, the impregnation is preferably effected utilizing a minimal volume of impregnating solution commensurate with an even distribution of the catalytic components on the carrier material. One preferred method involves the use of a steam jacketed rotary dryer.

The carrier material is immersed in the impregnating solution contained in the dryer and the carrier material tumbled therein by the rotating motion of the dryer, the volume of the carrier material so treated being initially in the range of from about 0.7 to about 1.0 with respect to the volume of impregnating solution. Evaporation of the solution in contact with the carrier material is expedited by applying steam to the dryer jacket. The evaporation is further facilitated by a continuous purge of the dryer utilizing a flow of dry gas, suitably air or nitrogen. In any case, the impregnating solution is evaporated at conditions to reduce the volatile matter of the impregnated carrier material to less than about 50 wt. percent as determined by weight loss on ignition at 500° C.

The impregnated carrier material thus dried is thereafter calcined in an oxygen-containing atmosphere at a temperature of from about 425° to about 815° C. in accordance with prior art practice, usually for a period of from about 1 to about 8 hours or more.

Hydrorefining particularly directed to the conversion of sulfurous compounds of a residual oil is generally effected at reaction conditions including an imposed hydrogen pressure of from about 100 to about 1000 p.s.i. Normally, the hydrogen is charged together with recycle hydrogen to provide from about 1000 to about 5000 standard cubic feet per barrel of hydrocarbon charge. Reaction conditions further include an elevated temperature, usually from about 95° to about 425° C. although temperature in the higher range, say from about 315° to about 425° C. are most suitable. Also, the sulfur-containing residual oil is suitably processed at a liquid hourly space velocity of from about 1.0 to about 20.

The following examples are presented in illustration of the method of catalyst preparation of this invention and are not intended as an undue limitation on the generally broad scope of the invention as set out in the appended claims.

EXAMPLE I

About 857 grams of an alumina sol, prepared by digesting 122 grams of aluminum in hydrochloric acid, was commingled with 7.1 cubic centimeters of concentrated hydrochloric acid to adjust the Al/Cl ratio to 1.3. The alumina sol was then admixed with 850 grams of an 18.4% aqueous hexamethylenetetramine solution sufficient to effect 180% neutralization of the free chloride in the sol upon total decomposition. The alumina sol was thereafter blended with a silica sol prepared by the acidification of 139 cubic centimeters of an aqueous water glass solution (18.5% $SiO_2$) with about 88 cubic centimeters of 50% hydrochloric acid, the Cl/Na ratio of the silica sol being 1.3. The sol blend was then dispersed as droplets in an oil bath at about 98° C. and formed into spherical gel particles. The spherical gel particles were aged in the hot oil bath for about 18 hours and thereafter for about 4 hours in a 3% aqueous ammonia solution at about 98° C. The spheres were then washed with about 19 meters of water containing 25 milliliters of a 28% aqueous ammonia solution and 15 milliliters of a 20% ammonium nitrate solution.

The alumina-silica spheres were dried in an oven at 125° C. until the volatile matter was reduced to about 26.5 wt. percent as evidenced by weight loss upon ignition at 500° C. The dried spheres were charged to a muffle furnace at 125° C. and calcined in an air atmosphere at a temperature increasing from 125° to about 600° C. over a 1 hour period. The spheres were then further calcined in the air atmosphere at 600° C. for about 1 hour. The calcined product has a surface area of about 323 m.$^2$/gm., an average pore diameter of about 78 angstroms and an average pore volume of about 0.63 cc./gm.

In the subsequent impregnation of the carrier material with the Group VI-B and Group VIII metal components and calcination of a final catalyst composite, the surface area and pore volume tend to decrease while the pore diameter tends to increase. Thus, upon subsequent impregnation and calcination, the present catalyst composite had a surface area of 200 m.$^2$/gm., an average pore diameter of 80 angstroms, and an average pore volume of 0.4 cc./gm.

Impregnation of the spheres was effected by treating the spheres with an aqueous solution of molybdic acid and nickel nitrate in a rotary steam dryer. The aqueous solution was prepared by commingling an aqueous solution of 38.5 grams of 85% molybdic acid and 23 milliliters of ammonium hydroxide with an aqueous solution of 13.5 grams of nickel nitrate hexahydrate and 12 milliliters of ammonium hydroxide, the resulting solution being diluted to 170 milliliters with water. 100 grams of the dried and calcined alumina-silica spheres were immersed in the impregnating solution which was then evaporated to dryness, with an additional hour of drying at 120° C. in a drying oven. The spheres were then dried in air at 400° C. for one hour and thereafter calcined in air at 595° C. for one hour. The catalyst composite thus prepared consisted of 2 wt. percent nickel and 16 wt. percent molybdenum on an alumina-silica carrier material comprising 88 wt. percent alumina and 12 wt. percent silica. The catalyst of this example is preferred where the hydrorefining of residual oils is designed primarily for the conversion and separation of sulfurous components.

EXAMPLE II (COMPARATIVE EXAMPLE)

By way of contrast, a catalyst was prepared substantially as described except that the alumina-silica carrier material was air dried and exhibited a 26.5% weight loss of volatile matter upon ignition at 500° C., and the spheres were charged to a muffle furnace at 200° C. and calcined in an air atmosphere at a temperature increasing from 200° to 600° C. over a 1 hour period. The spheres were then further calcined in an air atmosphere at 600° C. for about 1 hour as in the previous example. The calcined carrier material had a surface area of 302 m.$^2$/gm., an average pore diameter of 91 angstroms, and an average pore volume of 0.69 cc./gms. Upon impregnation of the carrier material and calcination substantially in accordance with Example I, the final catalyst composite had a surface area of 145 m.$^2$/gm., an average pore diameter of 110 angstroms, and an average pore volume of 0.4 cc./gm. This last described catalyst composition is preferred where the hydrorefining of residual oils is designed primarily for the conversion of $C_7$-insoluble asphaltenes.

I claim as my invention:

1. In a method of manufacturing a hydrorefining catalyst for hydrorefining residual oils of high asphaltene content at hydrorefining conditions, said catalyst being particularly effective for the conversion and separation of sulfurous components and said catalyst comprising a Group VI-B and Group VIII metal impregnated on a refractory inorganic oxide carrier material, the improvement which comprises drying the refractory inorganic oxide carrier material to contain less than about 30 wt. percent volatile matter prior to impregnation as determined by weight loss on ignition at 500° C., calcining the dried carrier material in an oxygen-containing atmosphere at a temperature increasing from about 125° to 600° C. in a period of from about 30 to about 90 minutes, and thereafter at a temperature of from about 600° to about 800° C. for a period of at least about 30 minutes.

2. The improvement of claim 1 further characterized in that said refractory inorganic oxide is a composite of alumina and silica.

3. The improvement of claim 1 further characterized in that said refractory inorganic oxide is alumina composited with silica in a weight ratio of from about 3:1 to about 9:1.

4. The improvement of claim 1 further characterized in that said Group VI–B metal comprises from about 5 wt. percent to about 20 wt. percent of said catalyst, and said Group VIII metal comprises from about 0.1 wt. percent to about 10 wt. percent thereof.

5. The improvement of claim 1 further characterized in that said Group VI–B metal is molybdenum and said Group VIII metal is nickel.

References Cited

UNITED STATES PATENTS

| 3,523,913 | 8/1970 | O'Hara | 252—455 R |
| 3,336,216 | 8/1967 | Taylor et al. | 252—458 X |
| 3,145,196 | 8/1964 | Engel | 252—458 X |

CARL F. DEES, Primary Examiner

U.S. Cl. X.R.

252—458, 459, 470